United States Patent Office 3,609,924
Patented Oct. 5, 1971

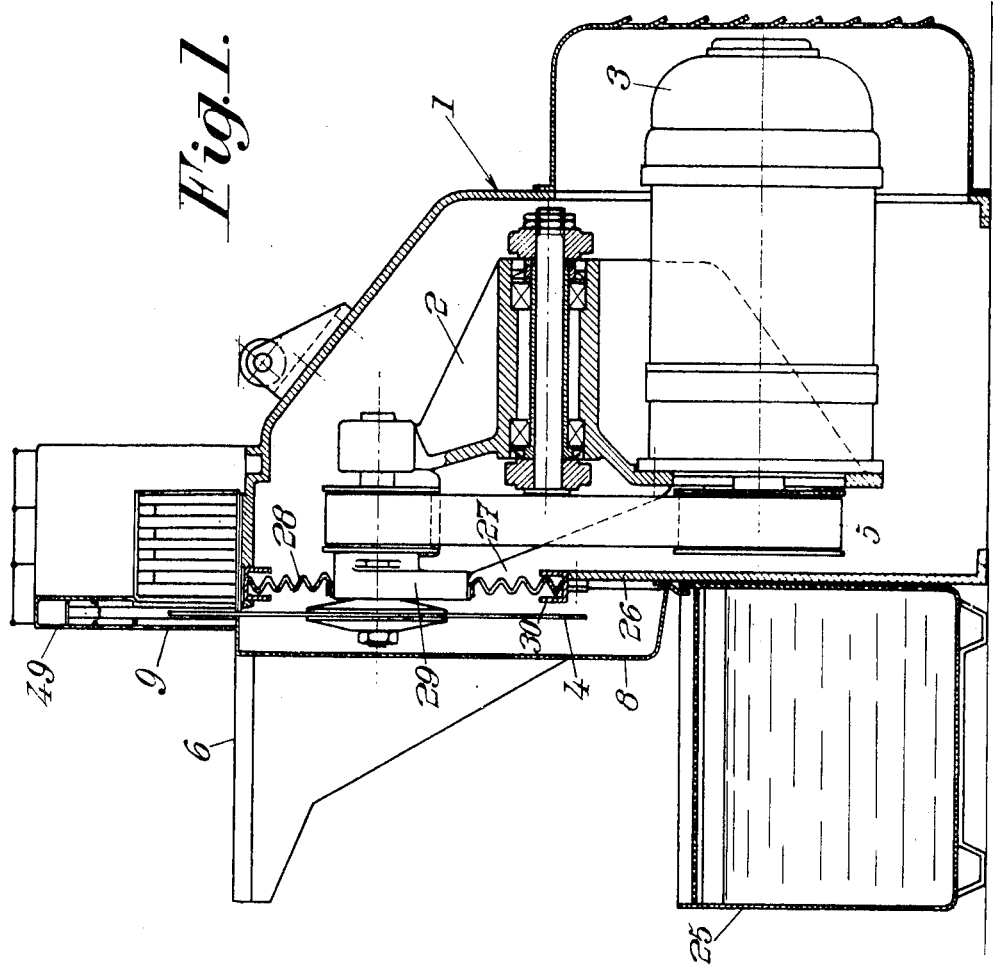

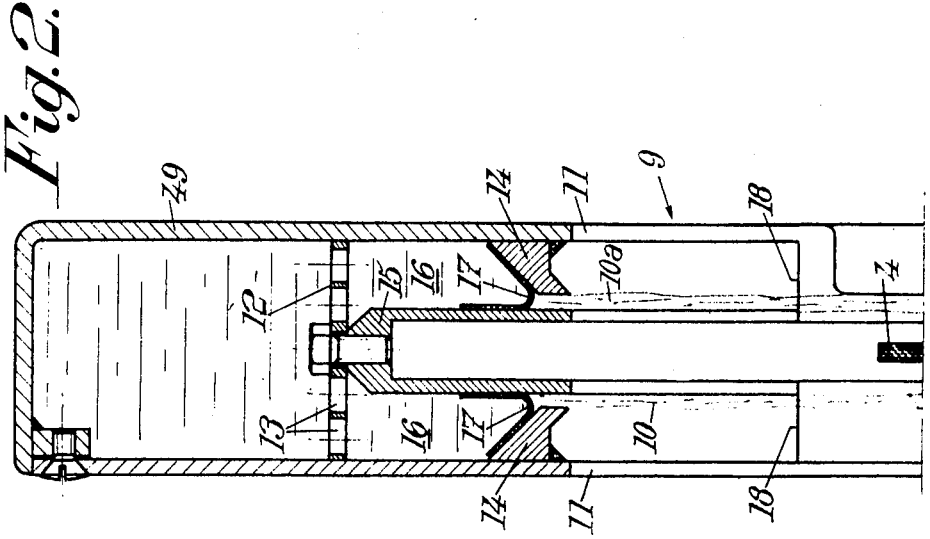

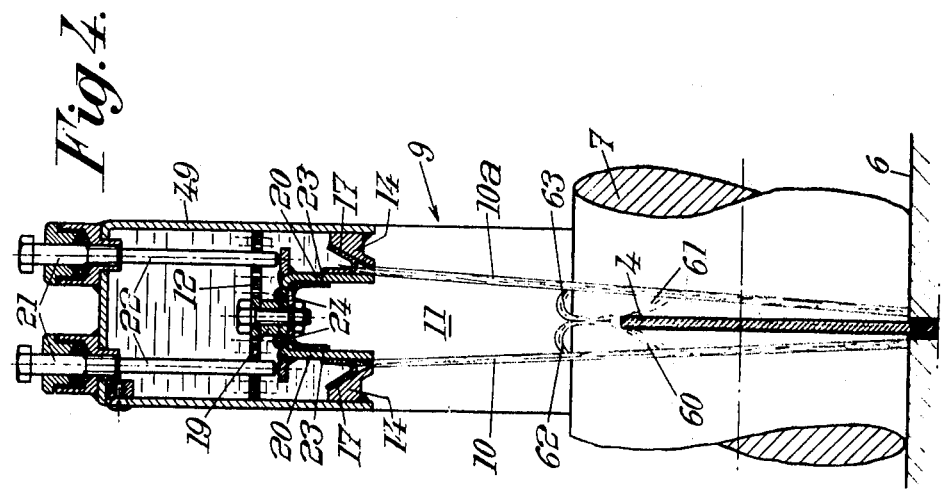
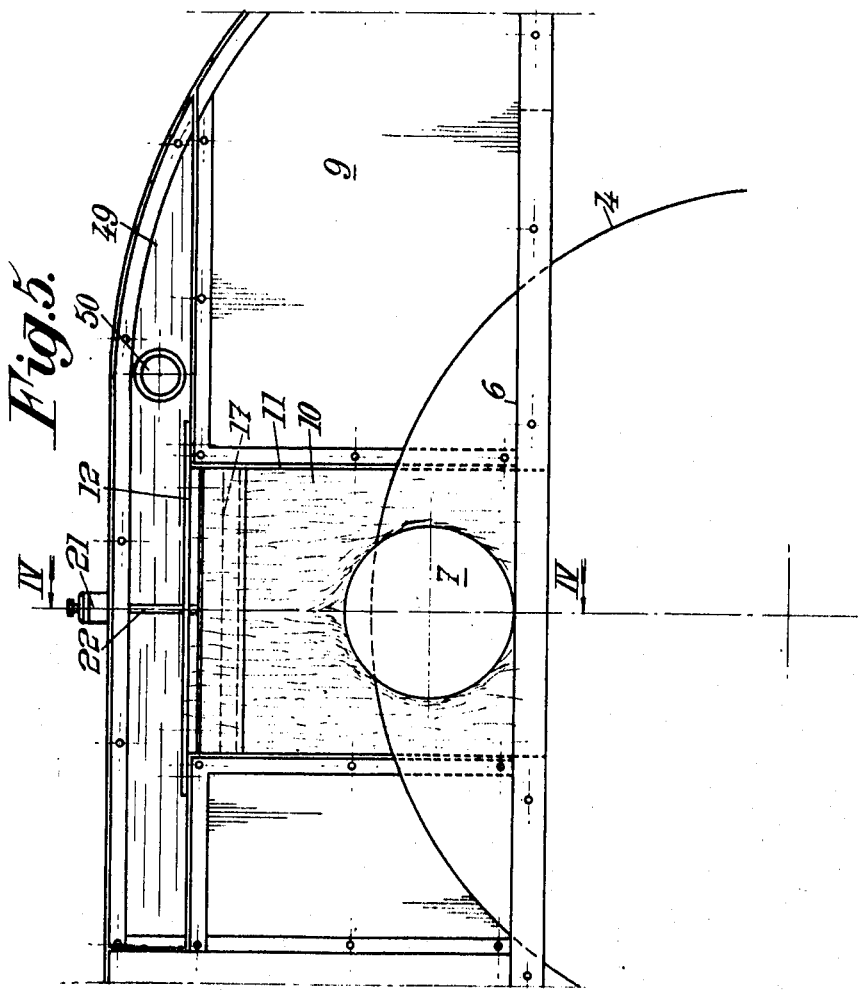

3,609,924
MACHINES HAVING ROTARY TOOLS
Jean Favot, 20 Rue Charles Martel, 54 Nancy, France, and Rene Willaume, 163 Bis, Rue de Vaugirard, 75 Paris 15eme, France
Filed Feb. 6, 1969, Ser. No. 797,050
Claims priority, application France, Feb. 8, 1968, 139,200
Int. Cl. B24b 55/02
U.S. Cl. 51—267                                     7 Claims

ABSTRACT OF THE DISCLOSURE

The machine comprises a rotary tool such as a grinding wheel or a milling cutter, having a peripheral work surface adapted to work a piece by relative movement between the tool and the piece in a direction perpendicular to the axis of rotation of the tool. A device for producing a flow of liquid at least onto the piece is provided; this device produces two curtains of liquid flowing parallel to the axis of rotation of the tool, these two liquid curtains being disposed on opposite sides of the tool. In addition to cooling the piece, these two curtains intercept projections of liquid and of particles caused by the tool.

---

This invention relates to machines comprising, on the one hand, a rotary tool of the type of a grinding wheel or milling cutter having a peripheral work surface adapted to work a piece by relative movement between the tool and the piece in a direction perpendicular to the axis of rotation of the tool, and on the other hand, a device for producing a flow of liquid onto the piece at least. The invention is more particularly but not exclusively concerned with cutting or sectioning machines.

In rotary tool machines of this type, there is created, under the effect of the working of the tool on the piece and of the centrifugal forces, a projection of particles and of liquid in directions at least approximately perpendicular to the axis of rotation of the tool, and machines are known in which the device for producing a flow of liquid creates a curtain of liquid flowing parallel to the axis of rotation of the tool, this liquid curtain having the role of intercepting, at least in part, the projections of liquid and of particles due to the tool.

Nevertheless, experience shows that tools which rotate at high speed generate, in the manner of a centrifugal fan, currents of air which are apt to deform and even to "tear" the liquid curtain so that this curtain can no longer fulfil its role.

Moreover, the particles projected by the tool frequently arrive at the liquid curtain in directions practically normal to the surface of the curtain at the point of impact of the particles. The result is that the particles having a high kinetic energy pass through this curtain.

The chief object of this invention is to mitigate the above-mentioned disadvantages and to provide a device for producing a flow of liquid which limits the projections taking place during operation of the machine.

The machine according to the invention is characterized by the fact that the liquid flow forms at least one curtain disposed near the rotary tool in a plane substantially perpendicular to the axis of rotation of this tool.

According to an advantageous feature of the invention, the liquid flow forms two curtains disposed axially on opposite sides of the rotary tool.

From these features, it results that, since the curtains of liquid are perpendicular to the axis of rotation of the tool, the liquid and the particles which are projected by the tool in directions practically perpendicular to the axis of rotation of the tool arrive at the liquid curtains with a small angle of incidence with respect to the planes of these curtains. The interception of the particles by these curtains is good, for the particles must accomplish a long path in these curtains and they are thus braked by the liquid. This is not the case in known machines where the particles strike the curtains substantially perpendicular to the planes of the curtains, for then, the particles have only a short path to accomplish in the curtains and are only slightly braked by the liquid.

Furthermore, the liquid curtains are not disturbed by the air currents generated by the tool, for these air currents move substantially parallel to the curtains.

As for the liquid and the particles which are projected by the tool in directions perpendicular to the axis of rotation of the tool, they do not reach the liquid curtains and are in general collected by a safety hood provided for this purpose.

When the liquid is a transparent liquid, such as water for example, the work of the tool on the piece can easily be observed through these curtains, for the vision is not disturbed by deformation of the curtains.

In any case, the invention will be well understood from the following complementary description, as well as the accompanying drawings, which complementary description and drawings are, of course, given merely by way of example.

FIG. 1 of these drawings is an overall view in section of a cutting machine according to the invention;

FIG. 2 is a view in section, on an enlarged scale, taken along II—II of FIG. 3, of the device for producing the flow of liquid of the machine of FIG. 1;

FIG. 3 is a lateral view with parts removed, and on a smaller scale than in FIG. 2, of the device for producing the liquid flow;

FIGS. 4 and 5 are views analogous to the views of FIGS. 2 and 3 and show a modification of the device for producing the liquid flow, FIG. 4 being a section along IV—IV of FIG. 5.

Figure 6:
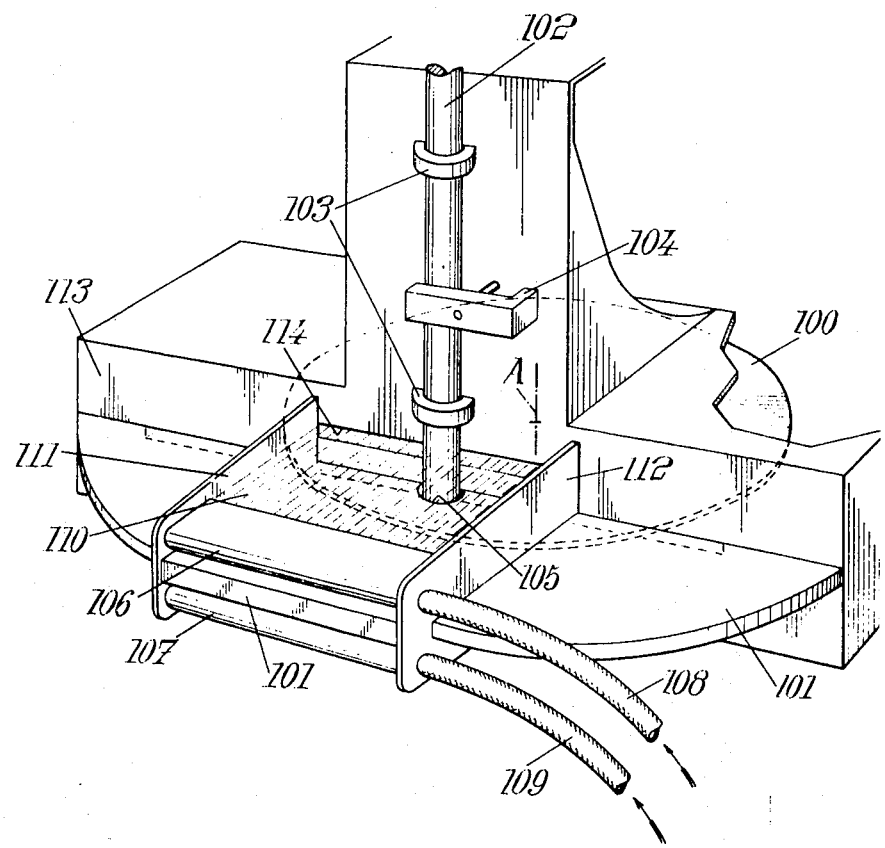
FIG. 6 shows, in perspective, a cutting machine according to the invention with a vertical axis of rotation of the tool.

The cutting machine (FIG. 1) comprises, as a whole, a frame 1 at the interior of which is mounted a rockable arm 2. This arm carries, at one end, a motor 3 driving for example a grinding wheel 4, mounted at the other end, by a belt 5. The wheel 4 projects by a certain height above a table 6 intended to receive the piece 7 to be cut (FIGS. 3–5). Moreover, the wheel is housed in a safety hood 8 which comprises, above the table 6, a cover 9 provided with windows 11 for the passage of the pieces 7.

According to the invention, the machine is characterized by the fact that the liquid forms at least one curtain 10 disposed near the wheel 4 in a plane substantially perpendicular to the axis of revolution of the wheel 4.

In the embodiments which are represented in FIGS. 1 to 5, the cover 9 of the machine comprises two windows 11 which are disposed on opposite sides of the wheel 4 and which define open areas substantially perpendicular to the axis of rotation of the wheel 4.

The device for producing the liquid flow produces two curtains of liquid 10 and 10a which pass respectively in front of the areas defined by the windows 11.

Accordingly to the embodiments of FIGS. 1–5, the device for producing the liquid flow comprises a recipient 49 which is provided in the upper part of the cover 9 above the windows 11; the two liquid curtains 10 and 10a flow from this recipient 49.

In the embodiment of FIGS. 2 and 3, the recipient 49 comprises a horizontal plate 12 provided with openings 13 through which the liquid flows. The purpose of this plate is to break the eddies caused by the arrival of the liquid via the orifice 50 in the upper part of the recipient.

Immediately above the openings 11, the recipient comprises two spouts 14, fixed to it by welding for example, and a central guide 15 mounted under the plate 12. The liquid, after its passage through the openings 13, is thus distributed in two troughs 16 symmetrical about the plane of the wheel 4. In the lower part of each trough 16, and between the spouts 14 and the central guide 15, is disposed a sieve 17 playing the role of a jet-breaker.

In this embodiment, the liquid flows, through the sieves 17, solely by gravity.

In order that the liquid curtains 10 and 10a completely mask the windows 11, the sieve 17 (FIG. 3) is given a length greater than the width of the windows 11. Preferably, the plate 12 will also have a length greater than the width of these windows 11. The liquid thus flows from the recipient 49 over a width which is greater than that of the windows 11. At a height higher than the height which the piece 7 can attain, steps 18 are provided, opposite each other, forming deflectors for the liquid. This liquid flows over the steps 18, and then along the sides of the windows 11, thus avoiding the formation of a central vein of liquid which would leave empty spaces at the sides. Due to the steps 18, the curtains 10 and 10a are thus uniform in width and occupy the entire area of the windows 11.

As can be seen in FIGS. 2, 3 and 4, the wheel 4 is isolated from the exterior and the particles projected by this wheel are either collected by the cover 9 and the hood 8 when they leave the wheel in directions perpendicular to its axis of rotation, or intercepted by the curtains 10 and 10a which carry them towards the bottom, as is the case with the projections 60 and 61 represented in FIG. 4. Moreover, the piece 7 is wetted and cooled in its zone of contact with the wheel 4 by the liquid which falls on it due to the fact that the impact of the liquid on the piece 7 is sufficiently near to the wheel 4. Finally, when the liquid used is water, the curtains 10 and 10a permit observation of the work of the wheel 4 on the piece 7.

The embodiment of FIGS. 2 and 3 is more particularly usable in the case of a water curtain of small thickness and of relatively low flow-rate (for example from 20 to 40 litres per minute), under low pressure.

In the case in which the flow-rate is considerable (for example from 40 to 100 litres per minute), under a pressure of from 0.1 to 0.2 bar, the embodiment of FIGS. 4 and 5 can be used. In FIG. 4, it can be seen that the curtains 10 and 10a are slightly convergent towards the bottom; thus, at their contact on the piece 7 and the table 6, they give rise to splashes 62 and 63, due to the pressure, which are reflected towards the wheel 4, which favours its cooling.

The recipient 49 comprises a perforated plate 12 from which is suspended a rod 19; on this rod are articulated flaps 20 whose lower parts form a guide, with the spouts 14, for the liquid. The position of each flap 20 is adjustable by means of a screw 21 threaded into the wall of the recipient and extended by a finger 22 bearing against a flap 20. A return spring 23 urges the flaps towards their position of minimum flow-rate. Each flap is pivotably mounted about an axis 24.

In this embodiment, since the liquid is under pressure, there is no risk of the formation of a central vein of liquid, and the steps 18 can be dispensed with. The sieves 17 then have a length equal to the width of the openings 11.

In these two embodiments, the liquid, after having wetted the piece 7, flows (FIG. 1) into a recuperation tank 25, from where, possibly after filtering, it is recycled.

The second embodiment with liquid flow under pressure is also applicable to a machine whose wheel has a vertical axis of rotation. In such a case, the curtains 10 and 10a are constrained, by the pressure of the liquid, to flow in horizontal planes, at least in the vicinity of the piece 7, which is of course not possible with a device in which the liquid flow is produced by gravity.

Such an arrangement is represented in FIG. 6, which shows a cutting machine whose wheel 100 has a vertical axis of rotation A.

This wheel 100 is housed in a cover 101 and has the role of cutting a bar 102 which is vertically guided by guides 103 and maintained in position when the wheel 100 attacks it by a clamp 104. The bar 102 penetrates through the cover 101 through windows of which only the window 105 is visible in FIG. 6.

The device for producing the flow of liquid comprises two recipients 106 and 107 which are fed with liquid under pressure by conduits 108 and 109 and which produce liquid curtains flowing along horizontal planes, only the curtain 110 being visible in FIG. 6.

These liquid curtains are disposed on opposite sides of, and near, the cover 101 and are limited laterally by sheets 111 and 112. These curtains arrive at the vertical work table 113 perpendicular to this table and pass through this table through openings 114 in order to be finally collected in a tank (not shown).

Apart from the fact that the curtains 110 are at the exterior of the cover 101 and collect the projections of liquid and of particles which come out of the cover 101 through the windows 105, these curtains 110 have effects which are analogous to the effects of the curtains 10 and 10a.

According to the embodiment represented in FIG. 1, there is provided, under the table 6 and between the wheel 4 and the members driving this wheel, a partition, at least in part deformable.

This partition is formed of a rigid part 26, in which is provided an opening 27 for the rocking of the wheel 4 and a deformable part 28, for example of rubber. The partition 28 is fixed, at the interior, to the spindle-holder 29, and at the exterior, to the rigid partition 26 by collars 30. During rocking of the wheel, the partition 28 becomes deformed, but continues to isolate the wheel from the internal members of the cutting machine. The partition 28 protects these members against the particles projected by the wheel and the liquid which it channels toward the tank 25.

The present invention provides a machine having a rotary tool, whose use has just been described, and which has various advantages, in particular:

Simplicity of the device for producing the flow of liquid which ensures the cooling of the piece and of the tool and which limits the projections of liquid and of particles due to the tool;

Possibility of observing the work of the tool through a window in front of which passes the liquid curtain since this curtain is not disturbed by the air currents generated by the wheel and intercepts the particles.

What we claim is:

1. In a machine comprising
a frame,
a table mounted on said frame for supporting a work piece,
a cutting wheel mounted on said frame and movable to be able to project through said work table and bite into said piece, said wheel having a peripheral cutting surface, and
driving means mounted on said frame for driving said wheel in rotation, the improvement comprising,
a recipient for liquid mounted in a position remote from the table and which can never be reached by the wheel,
inlet means in said recipient for the introduction of a liquid into said recipient,
and outlet means fed from said recipient, in the form of a pair of elongated slots facing the work piece and substantially parallel to the plane of the wheel and disposed near the plane of the wheel but on opposite sides thereof, and adapted to deliver the liquid in the form of a pair of liquid curtains, during the outflow of said liquid from said recipient, so that said liquid curtains are disposed substantially parallel to the wheel, near to this wheel and on opposite sides thereof, and strike the work piece in a slightly convergent manner causing reflected liquid to splash against and thereby cool the zone of contact of the wheel and work piece.

2. A machine according to claim 1, in which the axis of rotation of the tool is horizontal, and wherein the recipient is disposed above the piece and from which the curtains of liquid flow by gravity.

3. A machine comprising
a frame,
a table mounted on said frame for supporting a work piece,
a cutting wheel mounted on said frame and movable to be able to project through said work table and bite into said piece, said wheel having a peripheral cutting surface,
driving means mounted on said frame for driving said wheel in rotation,
a cover mounted on said table to cover the portion of the wheel projecting through said table, said cover having two open windows through which said piece passes when it is in its work position on said table,
a recipient for liquid mounted in a portion of the cover remote from the table and which can never be reached by the wheel,
inlet means in said recipient for the inlet of a liquid into said recipient,
and outlet means in said recipient, in the form of a pair of elongated slots facing the work piece and parallel to the plane of the wheel and disposed near the plane of the wheel but on opposite sides thereof, so as to produce a pair of liquid curtains, during the outlet of said liquid from said recipient, which strike the work piece and which are disposed substantially parallel to the wheel, near to this wheel, and on opposite sides thereof, these liquid curtains passing respectively in front of said two windows.

4. A machine according to claim 3, wherein the recipient contains spouts in which are disposed sieves, said spouts and their sieves extending over a distance greater than the width of the windows, whereby the liquid flowing through these spouts and sieves extends at least over the entire width of the windows.

5. A machine according to claim 1, wherein means are provided for generating pressure in said recipient to project therefrom said curtains of liquid.

6. A machine according to claim 5, wherein the axis of rotation of the tool is horizontal.

7. A machine according to claim 5, wherein the axis of rotation of the tool is vertical.

References Cited

UNITED STATES PATENTS

| | | | |
|---|---|---|---|
| 2,378,070 | 6/1945 | Eastwood | 51—267 |
| 2,492,684 | 12/1949 | Coates | 51—267 X |
| 1,081,082 | 12/1913 | Alden | 51—267 X |
| 1,832,104 | 11/1931 | Drake | 51—267 X |
| 2,110,441 | 3/1938 | Kasch | 51—267 |

FOREIGN PATENTS

| | | | |
|---|---|---|---|
| 208,032 | 3/1940 | Switzerland | 51—267 |
| 168,409 | 6/1951 | Austria | 51—267 |

OTHER REFERENCES

Metalworking Production, Oct. 5, 1956, pp. 1605–1608, by P. C. Dooley.

JAMES L. JONES, JR., Primary Examiner